Feb. 24, 1959 D. W. KELBEL 2,874,590

TWO PATH POWER FLOW TURBINE TRANSMISSION

Filed March 13, 1952

Inventor:
Donald W. Kelbel
By Keith J. Blews

United States Patent Office 2,874,590
Patented Feb. 24, 1959

2,874,590

TWO PATH POWER FLOW TURBINE TRANSMISSION

Donald W. Kelbel, Muncie, Ind., assignor to Borg-Warner Corporation, Chicago, Ill., a corporation of Illinois Application March 13, 1952, Serial No. 276,392

34 Claims. (Cl. 74—688)

This invention relates to power transmission mechanism and more particularly to a mechanism for transmitting torque from the engine to the drive wheels of an automotive vehicle.

It is an object of the present invention to provide an improved power transmission mechanism.

Another object of the invention is to provide an improved and simplified transmission in which a high speed forward drive can be obtained in three different manners.

A further object of the invention is to provide a transmission utilizing planetary gearing in which a low speed forward drive and a reverse drive ratio are achieved in a simplified manner with the reverse ratio providing a slower speed drive than the low speed forward ratio.

An additional object of the invention is to provide a transmission adapted for achieving a plurality of forward drive ratios and a reverse drive ratio in a simplified manner.

Still another object of the present invention is to provide a transmission mechanism through which two path power flow, partially mechanical and partially hydraulic, can be achieved in one or more of the drive ratios to utilize the torque multiplying advantages of a hydraulic drive while minimizing the disadvantages thereof.

A still further object of the invention is to provide an improved hydraulic and friction clutch type multi-drive ratio transmission in which power ratio changing can be utilized throughout all of the drive ratios.

A specific object of the present invention is to provide a multi-drive ratio transmission mechanism embodying full hydraulic drives in reverse ratio and low speed forward ratio, a partially hydraulic and partially mechanical drive in intermediate forward speed ratio and an option of three different drives in high speed forward ratio, one fully mechanical, another fully hydraulic and the third partially mechanical and partially hydraulic.

The transmission includes generally a hydraulic torque converter and a friction clutch arranged in parallel for transmitting torque alternately or concurrently to a compound planetary gear set with various clutches and brakes utilized for coupling or braking elements of the transmission to obtain the desired drive ratios therethrough. The arrangement and operation of the transmission is such that a fully hydraulic low speed forward drive ratio is provided through the hydraulic torque converter, a partially mechanical and partially hydraulic intermediate forward speed drive ratio is provided through both the friction clutch and the hydraulic converter, and a fully hydraulic reverse drive ratio is provided through the hydraulic torque converter. A high speed forward drive ratio or direct drive is provided through the transmission in any of three different manners, one being a fully mechanical drive through the friction clutch and another clutch to bypass the hydraulic torque converter and the gear set, another being a partially hydraulic and partially mechanical drive through both the friction clutch and the hydraulic torque converter and the third being a fully hydraulic drive through the torque converter. The reverse drive ratio provides a somewhat slower drive speed than the low speed forward drive, a desirable feature usually unobtainable in a planetary transmission. The three different direct drives can be obtained without any changes whatsoever in the transmission itself by proper arrangement of the transmission controls so that the automobile manufacturer has a choice of any of the three types of high speed drives provided in the improved transmission of this invention.

Other objects, features and advantages of the present invention will be apparent from the detailed description of one embodiment, by way of preferred example only, taken in conjunction with the accompanying drawings, in which:

Figures 1, 2:
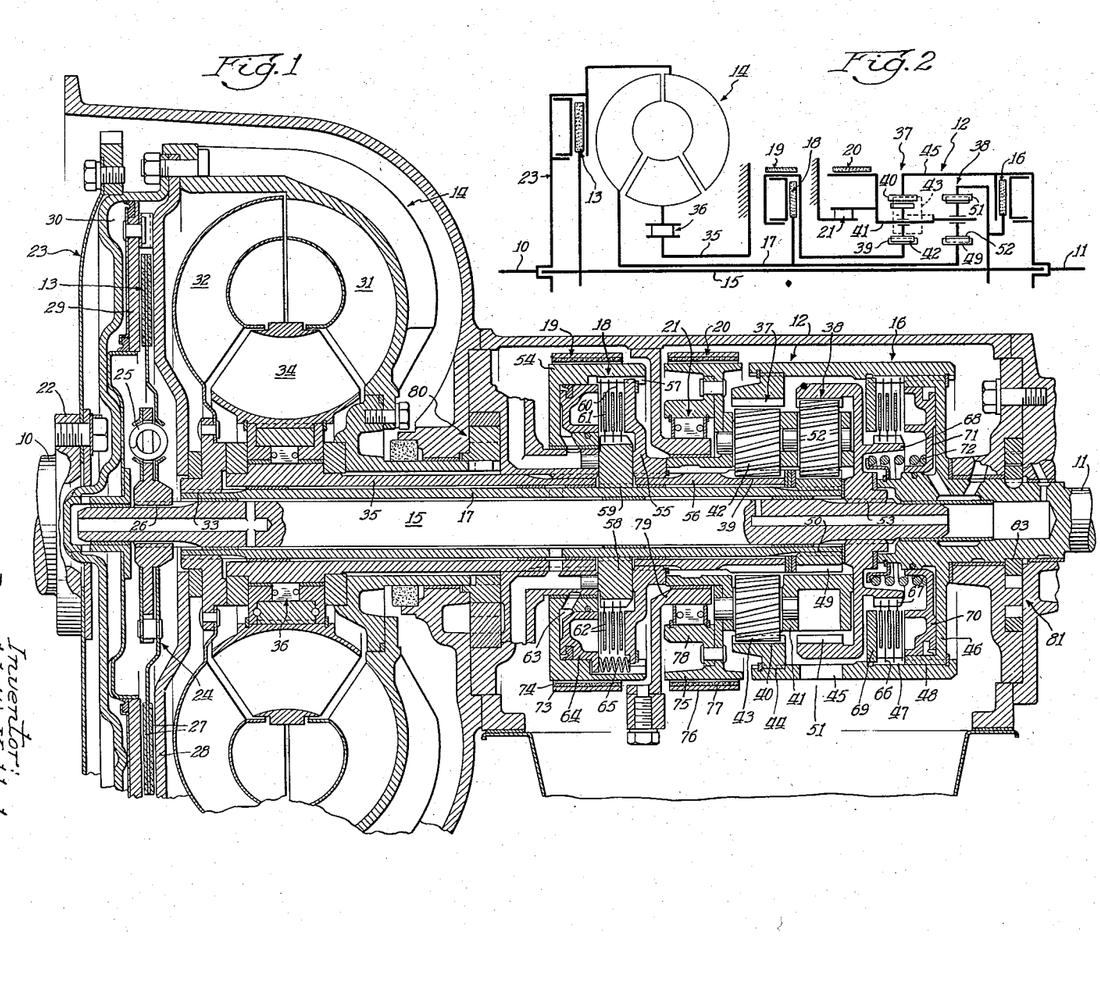
Fig. 1 is a longitudinal, sectional view of the transmission mechanism according to the present invention with some parts shown in elevation.
Fig. 2 is a schematic diagram of the transmission for clearly illustrating the operation thereof.

Referring now to the figures, the reference numeral 10 designates a drive shaft which may be driven by the engine of an automotive vehicle (not shown) and which is arranged to drive a driven shaft 11 through a compound planetary gear set 12. The gear set 12 may be connected with the drive shaft 10 either alternately or concurrently through a friction clutch 13 or a hydraulic torque converter 14 arranged in parallel with the friction clutch. The friction clutch 13 transmits torque from the drive shaft 10 to the gear set 12 and the driven shaft 11 through an intermediate shaft 15 which is rotatably supported in the transmission by having its end portions journalled at the ends of the drive shaft 10 and the driven shaft 11. A friction clutch 16 is provided for selectively connecting the intermediate shaft 15 with the driven shaft 11. The torque converter transmits torque from the drive shaft 10 to the gear set 12 through a sleeve additional shaft 17 and a friction clutch 18. A friction brake 19, another friction brake 20 and an overrunning or one-way brake 21 are provided for selectively braking various elements of the gear set 12 in order to provide reactions for achieving the desired drive ratios as will be described.

The drive shaft 10 has an integral flange 22 formed thereon which is bolted to a fly-wheel assembly 23. A clutch plate assembly 24, including chatter dampening springs 25, is splined to the intermediate shaft 15 at 26. The clutch plate assembly 24 has a pair of annular clutch facings 27, 27 secured on opposite sides thereof and adapted to be clamped between a clutch backing plate 28 bolted to the fly-wheel assembly 23 and an annular clutch piston 29 disposed within the fly-wheel assembly. The clutch plate assembly 24, the clutch backing plate 28 and the clutch piston 29 constitute the friction clutch 13. The clutch 13 may be engaged by admitting pressurized fluid to an annular piston chamber 30 formed between the piston 29 and the opposing surface of the fly-wheel assembly 23 to move the piston toward the clutch plate 28.

The hydraulic torque converter 14 comprises a vaned impeller member 31 bolted to the fly-wheel assembly 23, a vaned rotor 32 splined to the additional shaft 17 at 33 and a vaned stator 34 disposed about a portion of a stationary sleeve 35. An overrunning or one-way brake 36, which may be of the sprag type as shown, is disposed between the stator 34 and the sleeve 35 to allow forward rotation of the stator but to engage for preventing reverse rotation thereof. The fly-wheel assembly 23 and the impeller member 31 provide a substantially sealed torque converter chamber which is mostly filled with a fluid such as hydraulic or lubricating oil in order to provide the driving medium between the impeller and the rotor.

As is well known in the transmission field, rotation of the impeller 31 in the forward direction will cause rotation of the rotor 32 in the same direction at an increased torque due to the reaction provided by the vanes of the stator 34 tending to urge the stator in a reverse direction, which tendency is overcome by engagement of the one-way brake 36. As the speed of rotation of the rotor 32 approaches that of the impeller 31, the force imposed upon the vanes of the stator 34 will reverse in direction to cause rotation of the stator in the forward direction with consequent overrunning of the one-way brake 36. Thereafter, the torque converter 14 functions substantially as an ordinary fluid couple in which the impeller 31, the rotor 32 and the stator 34 all rotate at generally the same speed.

The compound planetary gear set 12 comprises a double planetary gear set 37 and a single planetary gear set 38. The gear set 37 includes a sun gear 39 journalled on the additional shaft 17, an internally toothed ring gear 40 and a planet gear carrier 41 rotatably carrying a plurality of planet gears 42 in mesh with the sun gear 39 and a plurality of planet gears 43 in mesh with the planet gears 42 and the ring gear 40. The ring gear 40 is fixedly secured to the driven shaft 11 by being splined at 44 within a drum 45 which is, in turn, splined about an integral annular flange portion 46 of the driven shaft by means of internal teeth 47 formed in the drum 45 and mating with external teeth 48 formed about the flange portion 46. The gear set 38 comprises a sun gear 49 splined to the sleeve shaft 17 at 50, an internally toothed ring gear 51 and the planet gear carrier 41 which rotatably carries another planet gear 52 meshing with the sun gear 49 and the ring gear 51. The ring gear 51 is provided with an integral radially inwardly extending web which is splined to the intermediate shaft 15 at 53.

The friction clutch 18 comprises a drum portion 54 which is fixedly secured to the sun gear 39 through an annular coupling member 55 which is splined to an integral sleeve portion 56 formed on the sun gear 39 and is also splined within the drum 54 by means of internal teeth 57 formed therein. The clutch includes an inner clutch member 58 which is splined to the sleeve shaft 17 at 59. The clutch is of the multiple disc type with a plurality of clutch discs 60 splined by means of the teeth 57 within the drum 54 and interleaved with a plurality of clutch discs 61 splined about the member 58 and each including clutch facings 62, 62 secured thereto. The friction clutch 18 is engaged by admitting fluid under pressure to an annular pressure chamber 63 formed between a clutch piston 64 and the axially opposed face of the drum 54 to clamp the discs 60 and 61 between the piston and the member 55. A plurality of compression springs 65 are provided between the piston 64 and the member 55 for urging the piston toward unactuated position to disengage the clutch 18 when the fluid pressure is released. Thus, the sun gear 39 will be coupled to the sleeve shaft 17 when the friction clutch 18 is engaged.

The friction clutch 16 is of the multiple disc type similar to clutch 18 and includes a plurality of clutch discs 66 splined within the drum 45 by means of the teeth 47 and a plurality of interleaved clutch discs 67 splined to an integral annular flange portion 68 formed on the ring gear web 51. A clutch backing ring 69 is splined within the drum 45 and a clutch piston 70 is adapted to clamp the discs 66 and 67 against the clutch ring 69 when fluid under pressure is admitted to an annular pressure chamber 71 formed between the piston and the adjacent axial face of the driven shaft flange 46. A compression spring 72 is provided for disengaging the clutch 16 by moving the piston 70 to unactuated position when the fluid pressure is released. It will be seen that the friction clutch 16, when engaged, couples the ring gear 51 to the driven shaft 11.

The friction brake 19 comprises a substantially annular brake band 73 with a substantially annular brake lining 74 secured about the inner periphery thereof. The brake band 73 is adapted to be contracted about the outer periphery of the drum 54 to engage and brake the same. Any suitable means may be utilized for engaging the friction brake 19 such as a hydraulic actuating cylinder (not shown). Engagement of the friction brake 19 brakes the sun gear 39 through the coupling member 55.

The friction brake 20 is adapted for braking a brake drum member 75 which is fixedly secured to the carrier 41. The brake 20 comprises a substantially annular brake band 76 and a substantially annular brake lining 77 secured about the inner periphery thereof and adapted to engage the outer periphery of the drum 75. Any suitable means may be employed for engaging the friction brake 20 such as a hydraulic actuating cylinder (not shown). As will be seen, when the brake 20 is engaged, the carrier 41 will be held stationary.

The one-way brake 21 may be of the sprag type shown and is disposed between an annular flange 78 secured to the brake drum 75 and a stationary portion 79 of the transmission casing. The one-way brake 21 is arranged to permit forward rotation of the carrier 41 and the brake drum 75 but engages to prevent reverse rotation thereof.

To provide fluid pressure sources for lubricating the moving parts of the transmission and for supplying fluid under pressure for engaging the various clutches and brakes a drive shaft pump 80 and a driven shaft pump 81 are provided. The pump 80 is driven by the drive shaft 10 through the impeller member 31 and a sleeve member 82 secured thereto. The pump 81 is driven by a portion 83 thereof which is secured to the driven shaft 11. The manner in which fluid under pressure is admitted behind the various clutch and brake actuating pistons does not constitute a portion of this invention, but any suitable hydraulic control means may be utilized.

A low speed forward drive ratio is provided through the hydraulic torque converter 14 and the gear set 37 by engagement of the friction clutch 18. The drive is through the fly-wheel assembly 23, the torque converter 14, the additional shaft 17, the friction clutch 18, the sun gear 39, the planet gears 42 and 43, the ring gear 40 and the drum 45 to the driven shaft 11. The resistance of the driven shaft 11 will impart a force on the carrier 41 tending to rotate the same in a reverse direction to cause engagement of the one-way brake 21 so that the carrier acts as the reaction member during low speed drive. It is readily seen that the gear train provided will produce a substantially reduced speed drive of the driven shaft 11 through the double planetary gearing. Torque multiplication is available through the torque converter 14.

If it is desired to eliminate free wheeling in the low speed drive due to the one-way brake 21 overrunning when the torque applied by the drive shaft 10 is cut off as by releasing the vehicle throttle (not shown), the friction brake 20 may be engaged to provide two-way braking of the carrier 41.

An intermediate speed forward drive ratio is completed through the gear set 12 and both the friction clutch 13 and the hydraulic torque converter 14 by engagement of the friction brake 19 and disengagement of the friction clutch 18 with the friction brake 20 disengaged. One path of power flow is through the fly wheel assembly 23, the torque converter 14, the additional shaft 17 and the sun gear 49 while the other path of power flow is through the fly wheel assembly 23, the engaged friction clutch 13, the intermediate shaft 15 and the ring gear 51. The sun gear 49 and the ring gear 51 are thus driven at the same speed so that the gear set 38 is locked up and the carrier 41 will rotate at the same speed. Braking of the sun gear 39 provides a reaction to drive the ring gear 40 and consequently the driven shaft 11 at an underspeed through the double planetary gearing.

As noted above, the high speed forward drive ratio or direct drive can be obtained in three different ways in the transmission of the present invention.

A direct mechanical drive can be obtained by engagement of the friction clutch 13 and the friction clutch 16 so that the drive is through the fly-wheel 23, the friction clutch 13, the intermediate shaft 15 and the friction clutch 16 to the driven shaft 11.

A two path power flow direct drive can be obtained by engagement of the friction clutch 13 and the friction clutch 18. In this drive one path of power flow is through the fly wheel assembly 23, the torque converter 14, the additional shaft 17 to the sun gear 49 and through the friction clutch 18 to the sun gear 39. A second path of powder flow is through the fly wheel assembly 23, the friction clutch 13, the intermediate shaft 15, and the ring gear 51. In this two path power flow drive the gear set 38 is locked up since the ring gear 51 and the sun gear 49 are driven at the speed as was the case in intermediate drive ratio, and in addition the gear set 37 is locked up since the carrier 41 and the sun gear 39 of this gear set are driven at the same speed. As a result, the ring gear 40 and the driven shaft 11 are driven at substantially the same speed as the drive shaft 10.

A fully hydraulic direct drive can be obtained by engagement of the friction clutch 18 and the friction clutch 16. In this drive all of the power flow is through the hydraulic torque converter 14 and the additional shaft 17 to the sun gear 49 and through the friction clutch 18 to the sun gear 39. The ring 40 is locked to the ring gear 51 through the friction clutch 16. Since both sun gears and both ring gears of the compound gear set 12 are respectively locked to one another, the entire gear set is locked up and provides a direct drive to the driven shaft 11.

A fully hydraulic reverse drive ratio is obtained by engagement of the friction brake 20 and the friction clutch 16. This drive is through the fly-wheel assembly 23, the hydraulic torque converter 14 and the intermediate shaft 17 to the sun gear 49. Since the carrier 41 is held stationary by the friction brake 20 and the ring gear 51 is locked to the driven shaft 11 through the friction clutch 16, the ring gear 51 and consequently the driven shaft 11 will rotate in a direction opposite to that of the drive shaft 10 at a reduced speed through the planet gear 52.

Assuming, for example, that the sun gear 39 has 24 teeth, the sun gear 49 has 21 teeth, the ring gear 40 has 57 teeth and the ring gear 51 has 51 teeth, the drive ratio in low speed forward will be 2.375 to 1.000. The intermediate speed forward drive ratio will be substantially 1.727 to 1.000 and the direct drive will be in any of the three options, substantially 1.000 to 1.000. With the gear sizes assumed, the two path power ratios will be 71% mechanical and 29% hydraulic in both the intermediate speed forward drive and the direct drive utilizing two path power flow. The reverse drive ratio will be 2.428 to 1.000 which will result in a substantially slower drive of the driven shaft 11 than that obtained in low speed forward. As is well known in the transmission field, a slower drive in reverse is desirable but is usually unobtainable in a transmission utilizing planetary gearing. The two path power flow utilized in intermediate forward drive and in one of the direct drives options serves to reduce the amount of torque carried by the hydraulic torque converter to reduce slippage and the generation of heat which results in power loss. At the same time, some of the torque multiplying effect of the converter is retained in order to make available additional torque while operating in these ratios.

It will be readily apparent from the following description that the present invention provides an improved transmission giving full hydraulic drive in both low speed forward and reverse drive ratios through a compound planetary gear set with the reverse ratio providing a slower speed drive than the low speed forward ratio. Three optional arrangements are possible for direct drive without requiring any modification to the transmission itself, one optional direct drive being a full mechanical drive, another optional direct drive being a partially mechanical and partially hydraulic two path power flow drive and the third optional direct drive being a fully hydraulic drive. Since all of the engaging means utilized are of the friction type, all of the ratio changes may be made while power is being continuously applied to the driven shaft.

It will be understood that modifications and variations may be effected without departing from the scope of the novel concepts of the present invention.

I claim:

1. In a transmission arranged for providing a plurality of speed ratios between a drive shaft and a driven shaft, the combination of an intermediate shaft, an additional shaft, first coupling means for transmitting torque from said drive shaft to said intermediate shaft, second coupling means for transmitting torque from said drive shaft to said additional shaft, a planetary gear set having a plurality of elements associated with said shafts one of which is connected with said first coupling means, third coupling means for connecting a second of said gear set elements to said additional shaft, and fourth coupling means for connecting said first-named gear set element to said driven shaft, whereby a first direct drive can be completed through said first and fourth coupling means exclusive of said second coupling means, a second direct drive can be completed through said second and third and fourth coupling means exclusive of said second coupling means, and a third two path power flow direct drive can be completed through said first, second and third coupling means.

2. In a transmission arranged for providing a plurality of speed ratios between a drive shaft and a driven shaft, the combination of an intermediate shaft, an additional shaft, first coupling means for transmitting torque from said drive shaft to said intermediate shaft, second coupling means for transmitting torque from said drive shaft to said additional shaft, a compound planetary gear set having a plurality of elements with a first one of said elements connected to said driven shaft, a second one of said elements connected to said intermediate shaft and a third one of said elements connected to said additional shaft, third coupling means for connecting a fourth one of said gear set elements to said additional shaft, and fourth coupling means for connecting said second gear set element to said driven shaft, a first direct drive between said drive and driven shafts being completed through said first coupling means by engagement of said fourth coupling means, a second direct drive between said drive and driven shafts being completed through said second coupling means and said gear set by engagement of said third coupling means with said fourth coupling means engaged and said first coupling means disengaged, and a third direct drive between said drive and driven shafts being completed through said gear set and both said first coupling means and said second coupling means with said third coupling means engaged and said fourth coupling means disengaged.

3. In a transmission arranged for providing a plurality of speed ratios between a drive shaft and a driven shaft, the combination of an intermediate shaft, an additional shaft, a first friction clutch for transmitting torque from said drive shaft to said intermediate shaft, a hydraulic torque converter for transmitting torque from said drive shaft to said additional shaft, a compound planetary gear set including a first ring gear connected to said intermediate shaft, a first sun gear connected to said additional shaft, a second ring gear connected to said driven shaft, a second sun gear and a planet gear carrier having a first planet gear in mesh with said first sun and ring gears, a second planet gear in mesh with said second sun gear and a third planet gear in mesh with said second ring gear and said second planet gear, a second friction clutch for connecting said second sun gear to said additional shaft, and a third friction clutch for connecting said first ring gear to said driven shaft, a first direct drive between said drive and driven shafts being completed through said first friction clutch by engagement of said third friction clutch, a second direct drive between said drive and driven shafts being completed through said hydraulic torque converter and said gear set by engagement of said second friction clutch with said third friction clutch engaged and said first friction clutch disengaged, and a third direct drive between said drive and driven shafts being completed through said gear set and both said first friction clutch and said hydraulic torque converter with said second friction clutch engaged and said third friction clutch disengaged.

4. In a transmission arranged for providing a plurality of drive ratios between a drive shaft and a driven shaft, the combination of an intermediate shaft, an additional shaft, a first friction clutch for transmitting torque from said drive shaft to said intermediate shaft, a hydraulic torque converter for transmitting torque from said drive shaft to said additional shaft, a compound planetary gear set including a first ring gear connected to said intermediate shaft, a first sun gear connected to said additional shaft, a second ring gear connected to said driven shaft, a second sun gear and a planet gear carrier having a first planet gear in mesh with said first sun and ring gears, a second planet gear in mesh with said second sun gear and a third planet gear in mesh with said second ring gear and second planet gear, a second friction clutch for connecting said second sun gear to said additional shaft, a first friction brake for braking said second sun gear, and a one-way brake for allowing rotation of said carrier in one direction but engaging to prevent rotation thereof in the opposite direction, one of said drive ratios being completed through said hydraulic torque converter and said gear set by engagement of said second friction clutch to cause engagement of said one-way brake, and another of said drive ratios being completed through said gear set and both said friction clutch and said hydraulic torque converter by engagement of said first friction brake to cause disengagement of said one-way brake when said second friction clutch is disengaged.

5. In a transmission, the combination of a drive shaft, a driven shaft, a hydrodynamic coupling device driven by said drive shaft, a planetary gear set having a plurality of gear set elements a first one of which is connected with said hydrodynamic device to be driven thereby and a second one of which is connected with said driven shaft, means for completing a reduced speed two path power flow drive between said shafts with one of said paths including said hydrodynamic device and including a brake for a third element of said gear set, and a clutch for connecting a fourth element of said gear set with said drive shaft, and means for completing a direct mechanical drive between said shafts exclusive of said hydrodynamic device and including a clutch for connecting said fourth element of said gear set with said driven shaft which completes the direct mechanical drive when it and said first-named clutch are engaged.

6. In a transmission arranged for providing a plurality of drive ratios between a drive shaft and a driven shaft, the combination of an intermediate shaft, an additional shaft, a first friction clutch for transmitting torque from said drive shaft to said intermediate shaft, a hydraulic torque converter for transmitting torque from said drive shaft to said additional shaft, a compound planetary gear set including a first ring gear connected to said intermediate shaft, a first sun gear connected to said additional shaft, a second ring gear connected to said driven shaft, a second sun gear and a planet gear carrier having a first planet gear in mesh with said first sun and ring gears, a second planet gear in mesh with said second sun gear and a third planet gear in mesh with said second ring gear and said second planet gear, a friction brake for braking said second sun gear, a second friction clutch for connecting said intermediate shaft to said driven shaft, one of said drive ratios being completed through said gear set and both said first friction clutch and said hydraulic torque converter by engagement of said friction brake, and another of said drive ratios being completed through said first friction clutch and said intermediate shaft by engagement of said second friction clutch with said friction brake disengaged.

7. In a transmission, the combination of a drive shaft, a driven shaft, a hydrodynamic coupling device driven by said drive shaft, a planetary gear set having a plurality of gear set elements, a first one of said gear set elements being connected with said hydrodynamic device to be driven thereby and a second one of said elements being connected with said driven shaft, means for providing a two path power flow reduced speed drive between said shafts with one path including said hydrodynamic device and including a clutch for connecting a third element of said gear set with said drive shaft and a brake for a fourth element of said gear set, and means for completing a two path power flow direct, or one to one drive, between said shafts with one path including said hydrodynamic device and including a clutch for locking together two elements of said planetary gear set which completes the drive when it and said first-named clutch are engaged.

8. In a transmission arranged for providing a plurality of drive ratios between a drive shaft and a driven shaft, the combination of an intermediate shaft, an additional shaft, a first friction clutch for transmitting torque from said drive shaft to said intermediate shaft, a hydraulic torque converter for transmitting torque from said drive shaft to said additional shaft, a compound planetary gear set including a first ring gear connected to said intermediate shaft, a first sun gear connected to said additional shaft, a second ring gear connected to said driven shaft, a second sun gear and a planet gear carrier having a first planet gear in mesh with said second sun and ring gears, a second planet gear in mesh with said second sun gear and a third planet gear in mesh with said second ring gear and said second planet gear, a second friction clutch for connecting said second sun gear to said additional shaft, and a friction brake for braking said second sun gear, one of said drive ratios being completed through said gear set and both said first friction clutch and said hydraulic torque converter by engagement of said friction brake, and another of said drive ratios being completed through said gear set and both said first friction clutch and said hydraulic torque converter by engagement of said second friction clutch with said friction brake disengaged.

9. In a transmission, the combination of a drive shaft, a driven shaft, a hydrodynamic device driven by said drive shaft, a planetary gear set having a plurality of gear set elements a first one of said elements being connected with said hydrodynamic device to be driven thereby and a second of said elements being connected to said driven shaft, means for completing a two path power flow reduced speed drive between said shafts with one of the paths including said hydrodynamic device and including a clutch for connecting said drive shaft with a third one of said gear set elements and a brake for a fourth one of said gear set elements, and means for completing a direct drive between said shafts in which all of the power from said drive shaft passes through said hydrodynamic device and including a clutch for connecting together two said elements of the gear set and a second clutch for connecting together two other said elements of the gear set for locking up the gear set.

10. In a transmission, the combination of a drive shaft, a driven shaft, a hydraulic torque converter driven by said drive shaft, gearing adapted to be driven from said torque converter, a first element of said gearing being connected to be driven by said torque converter and a second element of said gearing being connected with said driven shaft, a first clutch for connecting a third gearing element with said first gearing element and a brake for a fourth gearing element which provide a low speed drive between said shafts with all of the power from said drive shaft passing through said torque converter and a second clutch for connecting a fifth element of said gearing with said drive shaft and a second brake for said third gearing element for providing a two path intermediate power train between said shafts with only part of the power passing through said torque converter and the remainder passing through said second clutch, and a third clutch for connecting said fifth element of said gearing with said driven shaft which when engaged along with said second clutch completes a direct mechanical drive between said shafts, said first and second clutches completing a two path direct drive between said shafts with part of the power from said drive shaft passing through said torque converter and the remainder passing through said second clutch, said first and third clutches providing a hydraulic direct drive between said shafts with all of the power from said drive shaft passing through said torque converter.

11. In a transmission arranged for providing a plurality of drive ratios between a drive shaft and a driven shaft, the combination of an intermediate shaft, an additional shaft, a first friction clutch for transmitting torque from said drive shaft to said intermediate shaft, a hydraulic torque converter for transmitting torque from said drive shaft to said additional shaft, a compound planetary gear set including a first ring gear connected to said intermediate shaft, a first sun gear connected to said additional shaft, a second ring gear connected to said driven shaft, a second sun gear and a planet gear carrier having a first planet gear in mesh with said first sun and ring gears, a second planet gear in mesh with said second sun gear and a third planet gear in mesh with said second ring gear and said second planet gear, a second friction clutch for connecting said second sun gear to said additional shaft, a friction brake for braking said second sun gear, and a third friction clutch for connecting said first ring gear to said driven shaft, one of said drive ratios being completed through said gear set and both said first friction clutch and said hydraulic torque converter by engagement of said friction brake, and another of said drive ratios being completed through said hydraulic torque converter and said gear set by engagement of said second friction clutch and said third friction clutch with said first friction clutch and said friction brake disengaged.

12. In a transmission arranged for providing a plurality of drive ratios between a drive shaft and a driven shaft, the combination of an intermediate shaft, an additional shaft, a first friction clutch for transmitting torque from said drive shaft to said intermediate shaft, a hydraulic torque converter for transmitting torque from said drive shaft to said additional shaft, a planetary gear set including a ring gear connected to said driven shaft, a sun gear and a planet gear carrier having a first planet gear in mesh with said sun gear and a second planet gear in mesh with said first planet gear and said ring gear, a second friction clutch for connecting said sun gear to said additional shaft, a one-way brake for allowing rotation of said carrier in one direction but engaging to prevent rotation thereof in the opposite direction, and a third friction clutch for connecting said intermediate shaft to said driven shaft, one of said drive ratios being completed through said hydraulic torque converter and said gear set by engagement of said second friction clutch to cause engagement of said one-way brake, and another of said drive ratios being completed through said first friction clutch and said intermediate shaft by engagement of said third friction clutch with said second friction clutch and said friction brake disengaged.

13. In a transmission arranged for providing a plurality of drive ratios between a drive shaft and a driven shaft, the combination of an intermediate shaft, an additional shaft, a first friction clutch for transmitting torque from said drive shaft to said intermediate shaft, a hydraulic torque converter for transmitting torque from said drive shaft to said additional shaft, a compound planetary gear set including a first ring gear connected to said intermediate shaft, a first sun gear connected to said additional shaft, a second ring gear connected to said driven shaft, a second sun gear and a planet gear carrier having a first planet gear in mesh with said first sun and ring gears, a second planet gear in mesh with said second sun gear and a third planet gear in mesh with said second ring gear and said second planet gear, a second friction clutch for connecting said second sun gear to said additional shaft, and a one-way brake for allowing rotation of said carrier in one direction but engaging to prevent rotation thereof in the other direction, one of said drive ratios being completed through said hydraulic torque converter and said gear set by engagement of said second friction clutch to cause engagement of said one-way brake, and another of said drive ratios being completed through said gear set and both said first friction clutch and said hydraulic torque converter by engagement of said second friction clutch causing disengagement of said one-way brake.

14. In a transmission arranged for providing a plurality of drive ratios between a drive shaft and a driven shaft, the combination of an additional shaft, first coupling means for transmitting torque from said drive shaft to said additional shaft, a planetary gear set having a plurality of elements with a first one of said elements connected to said driven shaft and a second one of said elements connected to said additional shaft, second coupling means for connecting a third one of said gear set elements to said additional shaft, brake means for braking a fourth one of said gear set elements, and third coupling means for connecting a fifth one of said gear set elements to said driven shaft, one of said drive ratios being completed through said first coupling means and said gear set by engagement of said second coupling means with said brake means engaged, and another of said drive ratios being completed through said first coupling means and said gear set by engagement of said second coupling means and said third coupling means with said brake means disengaged.

15. In a transmission arranged for providing a plurality of drive ratios between a drive shaft and a driven shaft, the combination of an additional shaft, a hydraulic torque converter for transmitting torque from said drive shaft to said additional shaft, a compound planetary gear set including a first ring gear, a first sun gear connected to said additional shaft, a second ring gear connected to said driven shaft, a second sun gear and a planet gear carrier having a first planet gear in mesh with said first sun and ring gears, a second planet gear in mesh with said second sun gear and a third planet gear in mesh with said second ring gear and said second planet gear, a first friction clutch for connecting said second sun gear to said additional shaft, a one-way brake for allowing rotation of said carrier in one direction but engaging to prevent rotation thereof in the other direction, and a second friction clutch for connecting said first ring gear to said driven shaft, one of said drive ratios being completed through said hydraulic torque converter and said gear set by engagement of said first friction clutch to cause engagement of said one-way brake, and another of said drive ratios being completed through said hydraulic torque converter and said gear set by engagement of said first friction clutch and said second friction clutch causing disengagement of said one-way brake.

16. In a transmission arranged for providing a forward drive ratio and a reverse drive ratio between a drive shaft and a driven shaft, the combination of an additional shaft, a hydraulic torque converter for transmitting torque from said drive shaft to said additional shaft, a compound planetary gear set having a first ring gear, a first sun gear connected to said additional shaft, a second ring gear connected to said driven shaft, a second sun gear and a planet gear carrier having a first planet gear in mesh with said first sun and ring gears, a second planet gear in mesh with said second sun gear and a third planet gear in mesh with said second ring gear and said second planet gear, a first friction clutch for connecting said second sun gear to said additional shaft, a friction brake for braking said carrier, a one-way brake for allowing forward rotation of said carrier but engaging to prevent reverse rotation thereof, and a second friction clutch for connecting said first ring gear to said driven shaft, said forward drive ratio being completed through said hydraulic torque converter and said gear set by engagement of said first friction clutch to cause engagement of said one-way brake, and said reverse drive ratio being completed through said hydraulic torque converter and said gear set by engagement of said friction brake and said second friction clutch with said first friction clutch disengaged, said reverse drive ratio providing a slower drive speed of said driven shaft than said forward drive ratio for the same drive shaft speed.

17. In a transmission arranged for providing a plurality of forward drive ratios and a reverse drive ratio between a drive shaft and a driven shaft, the combination of an intermediate shaft, an additional shaft, first coupling means for transmitting torque from said drive shaft to said intermediate shaft, second coupling means for transmitting torque from said drive shaft to said additional shaft, a planetary gear set having a plurality of elements with a first one of said elements connected to said driven shaft and a second one of said elements connected to said additional shaft, third coupling means for connecting a third one of said gear set elements to said additional shaft, brake means for braking a fourth one of said gear set elements, and fourth coupling means for connecting a fifth one of said gear set elements to said driven shaft, one of said forward drive ratios being completed through said second coupling means and said gear set by engagement of said third coupling means and said brake means, another of said forward drive ratios being completed through said first coupling means and said intermediate shaft by engagement of said coupling clutch means with said brake means disengaged, and said reverse drive ratio being completed through said second coupling means and said gear set by engagement of said brake means with said fourth coupling means engaged and said first and third coupling means disengaged.

18. In a transmission arranged for providing a plurality of forward drive ratios and a reverse drive ratio between a drive shaft and a driven shaft, the combination of an intermediate shaft, an additional shaft, a first friction clutch for transmitting torque from said drive shaft to said intermediate shaft, a hydraulic torque converter for transmitting torque from said drive shaft to said additional shaft, a compound planetary gear set including a first ring gear, a first sun gear connected to said additional shaft, a second ring gear connected to said driven shaft, a second sun gear and a planet gear carrier having a first planet gear in mesh with said first sun and ring gears, a second planet gear in mesh with said second sun gear and a third planet gear in mesh with said second ring gear and said second planet gear, a second friction clutch for connecting said second sun gear to said additional shaft, a friction brake for braking said carrier, a one-way brake for allowing forward rotation of said carrier but engaging to prevent reverse rotation thereof, and a third friction clutch for connecting said first ring gear to said driven shaft, one of said forward drive ratios being completed through said hydraulic torque converter and said gear set by engagement of said second friction clutch to cause engagement of said one-way brake, another of said forward drive ratios being completed through said first friction clutch and said intermediate shaft by engagement of said third friction clutch, and said reverse drive ratio being completed through said hydraulic torque converter and said gear set by engagement of said friction brake with said third friction clutch engaged and said first and second friction clutches disengaged.

19. In a transmission arranged for providing a plurality of forward drive ratios and a reverse drive ratio between a drive shaft and a driven shaft, the combination of an intermediate shaft, an additional shaft, first coupling means for transmitting torque from said drive shaft to said intermediate shaft, second coupling means for transmitting torque from said drive shaft to said additional shaft, a planetary gear set having a plurality of elements with a first one of said elements connected to said driven shaft, a second one of said elements connected to said intermediate shaft and a third one of said elements connected to said additional shaft, third coupling means for connecting a fourth one of said gear set elements to said additional shaft, brake means for braking a fifth one of said gear set elements, and fourth coupling means for connecting said second gear set element to said driven shaft, one of said forward drive ratios being completed through said second coupling means and said gear set by engagement of said third coupling means and said brake means, another of said forward drive ratios being completed through said gear set and through both said first coupling means and said second coupling means by engagement of said third coupling means with said brake means disengaged, and said reverse drive ratio being completed through said second coupling means and said gear set by engagement of said brake means with said fourth coupling means engaged and said first and third coupling means disengaged.

20. In a transmission arranged for providing a plurality of forward drive ratios and a reverse drive ratio between a drive shaft and a driven shaft, the combination of an intermediate shaft, an additional shaft, a first friction clutch for transmitting torque from said drive shaft to said intermediate shaft, a hydraulic torque converter for transmitting torque from said drive shaft to said additional shaft, a compound planetary gear set including a first ring gear connected to said intermediate shaft, a first sun gear connected to said additional shaft, a second ring gear connected to said driven shaft, a second sun gear and a planet gear carrier having a first planet gear in mesh with said first sun and ring gears, a second planet gear in mesh with said second sun gear and a third planet gear in mesh with said second ring gear and said second planet gear, a second friction clutch for connecting said second sun gear to said additional shaft, a friction brake for braking said carrier, a one-way brake for allowing forward rotation of said carrier but engaging to prevent reverse rotation thereof, and a third friction clutch for connecting said first ring gear to said driven shaft, one of said forward drive ratios being completed through said hydraulic torque converter and said gear set by engagement of said second friction clutch to cause engagement of said one-way brake, another of said forward drive ratios being completed through said gear set and both said first friction clutch and said hydraulic torque converter by engagement of said second friction clutch causing disengagement of said one-way clutch, and said reverse drive ratio being completed through said hydraulic torque converter and said gear set by engagement of said friction brake with said third friction clutch engaged and said first and second friction clutches disengaged.

21. In a transmission arranged for providing a plurality of forward drive ratios and a reverse drive ratio between a drive shaft and a driven shaft, the combination of an additional shaft, first coupling means for transmitting torque from said drive shaft to said additional shaft, a planetary gear set having a plurality of elements with a first one of said elements connected to said driven shaft and a second one of said elements connected to said additional shaft, second coupling means for connecting a third one of said gear set elements to said additional shaft, brake means for braking a fourth one of said gear set elements, and third coupling means for connecting a fifth one of said gear set elements to said driven shaft, one of said forward drive ratios being completed through said first coupling means and said gear set by engagement of said second coupling means and said brake means, another of said forward drive ratios being completed through said first coupling means and said gear set by engagement of said second coupling means and said third coupling means with said brake means disengaged, and said reverse drive ratio being completed through said first coupling means and said gear set by engagement of said brake means with said third coupling means engaged and said second coupling means disengaged.

22. In a transmission arranged for providing a plurality of forward drive ratios and a reverse drive ratio between a drive shaft and a driven shaft, the combination of an additional shaft, a hydraulic torque converter for transmitting torque from said drive shaft to said additional shaft, a compound planetary gear set including a first ring gear, a first sun gear connected to said additional shaft, a second ring gear connected to said driven shaft, a second sun gear and a planetary gear carrier having a first planet gear in mesh with said first sun and ring gears, a second planet gear in mesh with said second sun gear and a third planet gear in mesh with said second ring gear and said second planet gear, a first friction clutch for connecting said second sun gear to said additional shaft, a friction brake for braking said carrier, a one-way brake for allowing forward rotation of said carrier but engaging to prevent reverse rotation thereof, and a second friction clutch for connecting said first ring gear to said driven shaft, one of said forward drive ratios being completed through said hydraulic torque converter and said gear set by engagement of said first friction clutch to cause engagement of said one-way brake, another of said forward drive ratios being completed through said hydraulic torque converter and said gear set by engagement of said second friction clutch causing disengagement of said one-way brake, and said reverse drive ratio being completed through said hydraulic torque converter and said gear set by engagement of said friction brake with said second friction clutch engaged and said first friction clutch disengaged.

23. In a transmission arranged for providing a plurality of drive ratios between a drive shaft and a driven shaft, the combination of an intermediate shaft, an additional shaft, first coupling means for transmitting torque from said drive shaft to said intermediate shaft, second coupling means for transmitting torque from said drive shaft to said additional shaft, a planetary gear set having a plurality of elements with a first one of said elements connected to said driven shaft, a second one of said elements connected to said intermediate shaft and a third one of said elements connected to said additional shaft, third coupling means for connecting a fourth one of said gear set elements to said additional shaft, brake means for braking said fourth gear set element, a one-way brake for allowing forward rotation of a fifth one of said gear set elements but engaging to prevent reverse rotation thereof, and fourth coupling means for connecting said intermediate shaft and said second gear set element to said driven shaft, a low one of said drive ratios being completed through said second coupling means and said gear set by engagement of said third coupling means to cause engagement of said one-way brake, an intermediate one of said drive ratios being completed through said gear set and both said first coupling means and said second coupling means by engagement of said brake means with said third coupling means disengaged, and a high one of said drive ratios being completed through said first coupling means and said intermediate shaft by engagement of said fourth coupling means with said brake means disengaged.

24. In a transmission arranged for providing a plurality of drive ratios between a drive shaft and a driven shaft, the combination of an intermediate shaft, an additional shaft, first coupling means for transmitting torque from said drive shaft to said intermediate shaft, second coupling means for transmitting torque from said drive shaft to said additional shaft, a planetary gear set having a plurality of elements with a first one of said elements connected to said driven shaft, a second one of said elements connected to said intermediate shaft and a third one of said elements connected to said additional shaft, third coupling means for connecting a fourth one of said gear set elements to said additional shaft, brake means for braking said fourth gear set element, and a one-way brake for allowing rotation of a fifth one of said gear set elements in one direction but engaging to prevent rotation thereof in the opposite direction, a low one of said drive ratios being completed through said second coupling means and said gear set by engagement of said third coupling means to cause engagement of said one-way brake, an intermediate one of said drive ratios being completed through gear set and both said first coupling means and said second coupling means by engagement of said brake means with said third coupling means disengaged, and a high one of said drive ratios being completed through said gear set and both said first coupling means and said second clutch means by engagement of said third clutch means with said brake means disengaged.

25. In a transmission arranged for providing a plurality of drive ratios between a drive shaft and a driven shaft, the combination of an intermediate shaft, an additional shaft, first coupling means for transmitting torque from said drive shaft to said intermediate shaft, second coupling means for transmitting torque from said drive shaft to said additional shaft, a planetary gear set having a plurality of elements with a first one of said elements connected to said driven shaft, a second one of said elements connected to said intermediate shaft and a third one of said elements connected to said additional shaft, third coupling means for connecting a fourth one of said gear set elements to said additional shaft, first brake means for braking said fourth gear set element, second brake means for braking a fifth one of said gear set elements, and fourth coupling means for connecting said intermediate shaft and said second gear set element to said given shaft, a low one of said drive ratios being completed through said second coupling means and said gear set by engagement of said third coupling means and said second brake means, an intermediate one of said drive ratios being completed through said gear set and both said first coupling means and said second coupling means by engagement of said first brake means with said third coupling means and said second brake means disengaged, and a high one of said drive ratios being completed through said second coupling means and said gear set by engagement of said third coupling means and said fourth coupling means with said first coupling means and said first brake means disengaged.

26. In a transmission arranged for providing a plurality of forward drive ratios between a drive shaft and a driven shaft, the combination of an intermediate shaft, an additional shaft, a first friction clutch for transmitting torque from said drive shaft to said intermediate shaft, a hydraulic torque converter for transmitting torque from said drive shaft to said additional shaft, a compound planetary gear set including a first ring gear connected to said intermediate shaft, a first sun gear connected to said additional shaft, a second ring gear connected to said driven shaft, a second sun gear and a planet gear carrier havinng a first planet gear in mesh with said first sun and ring gears, a second planet gear in mesh with said second sun gear and a third planet gear in mesh with said second ring gear and said second planet gear, a second friction clutch for connecting said second sun gear to said additional shaft, a friction brake for braking said second sun gear, a one-way brake for allowing rotation of said carrier in one direction but engaging to prevent rotation thereof in the opposite direction, and a third friction clutch for connecting said intermediate shaft to said driven shaft, a low one of said forward drive ratios being completed through said hydraulic torque converter and said gear set by engagemnet of said second friction clutch to cause engagement of said one-way brake, an intermediate one of said forward drive ratios being completed through said gear set and both said first friction clutch and said hydraulic torque converter by engagement of said friction brake with said second friction clutch disengaged, and a high one of said forward drive ratios being completed through said first friction clutch and said intermediate shaft by engagement of said third friction clutch with said friction brake disengaged.

27. In a transmission arranged for providing a plurality of forward drive ratios between a drive shaft and a driven shaft, the combination of an intermediate shaft, an additional shaft, a first friction clutch for transmitting torque from said drive shaft to said intermediate shaft, a hydraulic torque converter for transmitting torque from said drive shaft to said additional shaft, a compound planetary gear set including a first ring gear connected to said intermediate shaft, a first sun gear connected to said additional shaft, a second ring gear connected to said driven shaft, a second sun gear and a planet gear carrier having a first planet gear in mesh with said first sun and ring gears, a second planet gear in mesh with said second sun gear and a third planet gear in mesh with said second ring gear and said second planet gear, a second friction clutch for connecting said second sun gear to said additional shaft, a friction brake for braking said second sun gear, and a one-way brake for allowing rotation of said carrier in one direction but engaging to prevent rotation thereof in the opposite direction, a low one of said forward drive ratios being completed through said hydraulic torque converter and said gear set by engagement of said second friction clutch to cause engagement of said one-way brake, an intermediate one of said forward drive ratios being completed through said gear set and both said first friction clutch and said hydraulic torque converter by engagement of said friction brake with said second friction clutch disengaged, and a high one of said forward drive ratios being completed through said gear set and both said first friction clutch and said hydraulic torque converter by engagement of said second friction clutch with said friction brake disengaged.

28. In a transmission arranged for providing a plurality of forward drive ratios between a drive shaft and a driven shaft, the combination of an intermediate shaft, an additional shaft, a first friction clutch for transmitting torque from said drive shaft to said intermediate shaft, a hydraulic torque converter for transmitting torque from said drive shaft to said additional shaft, a compound planetary gear set including a first ring gear connected to said intermediate shaft, a first sun gear connected to said additional shaft, a second ring gear connected to said driven shaft, a second sun gear and a planet gear carrier having a first planet gear in mesh with said first sun and ring gears, a second planet gear in mesh with said second sun gear and a third planet gear in mesh with said second ring gear and said second planet gear, a second friction clutch for connecting said second sun gear to said additional shaft, a friction brake for braking said second sun gear, brake means for braking said carrier, and a third friction clutch for connecting said intermediate shaft and said second gear set element to said driven shaft, a low one of said forward drive ratios being completed through said hydraulic torque converter and said gear set by engagement of said second friction clutch and said brake means, an intermediate one of said forward drive ratios being completed through said gear set and both said first friction clutch and said hydraulic torque converter by engagement of said friction brake with said second friction clutch and said brake means disengaged, and a high one of said forward drive ratios being completed through said hydraulic torque converter and said gear set by engagement of said second friction clutch and said third friction clutch with said first friction clutch and said friction brake disengaged.

29. In a transmission arranged for providing three forward drive ratios and a reverse drive ratio between a drive shaft and a driven shaft, the combination of an intermediate shaft, an additional shaft, first coupling means for transmitting torque from said drive shaft to said intermediate shaft, second coupling means for transmitting torque from said drive shaft to said additional shaft, a planetary gear set having a plurality of elements with a first one of said elements connected to said driven shaft, a second one of said elements connected to said intermediate shaft and a third one of said elements connected to said additional shaft, third coupling means for connecting a fourth one of said gear set elements to said additional shaft, first brake means for braking said fourth gear set element, second brake means for braking a fifth one of said gear set elements, and fourth coupling means for connecting said intermediate shaft to said driven shaft, a low one of said forward drive ratios being completed through said second coupling means and said gear set by engagement of said third coupling means and said second brake means, an intermediate one of said forward drive ratios being completed through said gear set and both said first coupling means and said second coupling means by engagement of said first brake means with said third coupling means and said second brake means disengaged, a high one of said forward drive ratios being completed through said first coupling means and said intermediate shaft by engagement of said fourth coupling means with said first brake means disengaged, and said reverse drive ratio being completed through said second coupling means and said gear set by engagement of said second brake means with said fourth coupling means engaged and said first coupling means disengaged.

30. In a transmission arranged for providing three forward drive ratios and a reverse drive ratio between a drive shaft and a driven shaft, the combination of an intermediate shaft, an additional shaft, first coupling means for transmitting torque from said drive shaft to said intermediate shaft, second coupling means for transmitting torque from said drive shaft to said additional shaft, a planetary gear set having a plurality of elements with a first one of said elements connected to said driven shaft, a second one of said elements connected to said intermediate shaft and a third one of said elements connected to said additional shaft, third coupling means for connecting a fourth one of said gear set elements to said additional shaft, first brake means for braking said fourth gear set element, second brake means for braking a fifth one of said gear set elements, and fourth coupling means for connecting said second gear set element to said driven shaft, a low one of said forward drive ratios being completed through said second coupling means and said gear set by engagement of said third coupling means and said second brake means, an intermediate one of said forward drive ratios being completed through said gear set and both said first coupling means and said second coupling means by engagement of said first brake means with said third coupling means and said second brake means disengaged, a high one of said forward drive ratios being completed through said gear set and both said first coupling means and said second coupling means by engagement of said third coupling means with said first brake means disengaged, and said reverse drive ratio being completed through said second coupling means and said gear set by engagement of said second brake means with said fourth coupling means engaged and said first coupling means disengaged.

31. In a transmission arranged for providing three forward drive ratios and a reverse drive ratio between a drive shaft and a driven shaft, the combination of an intermediate shaft, an additional shaft, first coupling means for transmitting torque from said drive shaft to said intermediate shaft, second coupling means for transmitting torque from said drive shaft to said additional shaft, a planetary gear set having a plurality of elements with a first one of said elements connected to said driven shaft, a second one of said elements connected to said intermediate shaft and a third one of said elements connected to said additional shaft, third coupling means for connecting a fourth one of said gear set elements to said additional shaft, first brake means for braking said fourth gear set element, second brake means for braking a fifth one of said gear set elements, a one-way brake for allowing forward rotation of said fifth gear set element but engaging to prevent reverse rotation thereof, and fourth coupling means for connecting said second gear set element to said driven shaft, a low one of said forward drive ratios being completed through said second coupling means and said gear set by engagement of said third coupling means to cause engagement of said one-way brake, an intermediate one of said forward drive ratios being completed through said gear set and both said first coupling means and said second coupling means by engagement of said first brake means with said third coupling means disengaged, a high one of said forward drive ratios being completed through said second coupling means and said gear set by engagement of said third coupling means and said fourth coupling means with said first coupling means and said first brake means disengaged, and said reverse drive ratio being completed through said second coupling means and said gear set by engagement of said second brake means with said fourth coupling means engaged and said first coupling means disengaged.

32. In a transmission arranged for providing three forward drive ratios and a reverse drive ratio between a drive shaft and a driven shaft, the combination of an intermediate shaft, an additional shaft, a first friction clutch for transmitting torque from said drive shaft to said intermediate shaft, a hydraulic torque converter for transmitting torque from said drive shaft to said additional shaft, a compound planetary gear set including a first ring gear connected to said intermediate shaft, a first sun gear connected to said additional shaft, a second ring gear connected to said driven shaft, a second sun gear and a planet gear carrier having a first planet gear in mesh with said first sun and ring gears, a second planet gear in mesh with said second sun gear and a third planet gear in mesh with said second ring gear and said second planet gear, a second friction clutch for connecting said second sun gear to said additional shaft, a first friction brake for braking said second sun gear, brake means for braking said carrier, and a third friction clutch for connecting sid intermediate shaft to said driven shaft, a low one of said forward drive ratios being completed through said hydraulic torque converter and said gear set by engagement of said second friction clutch and said brake means, an intermediate one of said forward drive ratios being completed through said gear set and both said first friction clutch and said hydraulic torque converter by engagement of said first friction brake with said second friction clutch and said brake means disengaged, a high one of said forward drive ratios being completed through said first friction clutch and said intermediate shaft by engagement of said third friction clutch with said first friction brake disengaged, and said reverse drive ratio being completed through said hydraulic torque converter and said gear set by engagement of said second brake means with said third friction clutch engaged and said first friction clutch disengaged.

33. In a transmission arranged for providing three forward drive ratios and a reverse drive ratio between a drive shaft and a driven shaft, the combination of an intermediate shaft, an additional shaft, a first friction clutch for transmitting torque from said drive shaft to said intermediate shaft, a hydraulic torque converter for transmitting torque from said drive shaft to said additional shaft, a compound planetary gear set including a first ring gear connected to said intermediate shaft, a first sun gear connected to said additional shaft, a second ring gear connected to said driven shaft, a second sun gear and a planet gear carrier having a first planet gear in mesh with said first sun and ring gears, a second planet gear in mesh with said second sun gear and a third planet gear in mesh with said second ring gear and said second planet gear, a second friction clutch for connecting said second sun gear to said additional shaft, a first friction brake for braking said second sun gear, a second friction brake for braking said carrier, and a third friction clutch for connecting said first ring gear to said driven shaft, a low one of said forward drive ratios being completed through said hydraulic torque converter and said gear set by engagement of said second friction clutch and said second friction brake, an intermediate one of said forward drive ratios being completed through said gear set and both said first friction clutch and said hydraulic torque converter by engagement of said first friction clutch with said second friction clutch and said second friction brake disengaged, a high one of said forward drive ratios being completed through said gear set and both said first friction clutch and said hydraulic torque converter by engagement of said second friction clutch with said first friction brake disengaged, and said reverse drive ratio being completed through said hydraulic torque converter and said gear set by engagement of said second friction brake with said third friction clutch engaged and said first friction clutch disengaged.

34. In a transmission arranged for providing three forward drive ratios and a reverse drive ratio between a drive shaft and a driven shaft, the combination of an intermediate shaft, an additional shaft, a first friction clutch for transmitting torque from said drive shaft to said intermediate shaft, a hydraulic torque converter for transmitting torque from said drive shaft to said additional shaft, a compound planetary gear set including a first ring gear connected to said intermediate shaft, a first sun gear connected to said additional shaft, a second ring gear connected to said driven shaft, a second sun gear and a planet gear carrier having a first planet gear in mesh with said first sun and ring gears, a second planet gear in mesh with said second sun gear and a third planet gear in mesh with said second ring gear and said second planet gear, a second friction clutch for connecting said second sun gear to said additional shaft, a first friction brake for braking said carrier, a one-way brake for allowing forward rotation of said carrier but engaging to prevent reverse rotation thereof, a third friction clutch for connecting said first ring gear to said driven shaft, a low one of said forward drive ratios being completed through said hydraulic torque converter and said gear set by engagement of said second friction clutch to cause engagement of said one-way brake, an intermediate one of said forward drive ratios being completed through said gear set both said first friction clutch and said hydraulic torque converter by engagement of said first friction brake with said second friction clutch disengaged, a high one of said forward drive ratios being completed through said hydraulic torque converter and said gear set by engagement of said second friction clutch and said third friction clutch with said first friction clutch and said first friction brake disengaged, and said reverse drive ratio being completed through said hydraulic torque converter and said gear set by engagement of said second friction brake with said third friction clutch engaged and said first friction clutch disengaged.

References Cited in the file of this patent

UNITED STATES PATENTS

| | | | |
|---|---|---|---|
| 2,277,214 | Dodge | Mar. 24, | 1942 |
| 2,372,817 | Dodge | Apr. 3, | 1945 |
| 2,408,951 | Pollard | Oct. 8, | 1946 |
| 2,454,014 | Seybold | Nov. 16, | 1948 |
| 2,456,328 | Schneider | Dec. 14, | 1948 |
| 2,519,022 | Burtnett | Aug. 15, | 1950 |
| 2,532,897 | Dodge | Dec. 5, | 1950 |
| 2,547,236 | Sevenson | Apr. 3, | 1951 |
| 2,606,460 | Kelley | Aug. 12, | 1952 |
| 2,616,310 | Jandasek | Nov. 4, | 1952 |
| 2,749,773 | Simpson | June 12, | 1956 |